May 28, 1968  R. W. DYMOND  3,385,220

FLUID PUMP

Filed Aug. 17, 1966  3 Sheets-Sheet 1

INVENTOR.
RICHARD W. DYMOND
BY
*Hoffmann and Yount*
ATTORNEYS

May 28, 1968 R. W. DYMOND 3,385,220
FLUID PUMP
Filed Aug. 17, 1966 3 Sheets-Sheet 2

INVENTOR.
RICHARD W. DYMOND
BY
*Hoffmann and Yount*
ATTORNEYS

May 28, 1968  R. W. DYMOND  3,385,220
FLUID PUMP

Filed Aug. 17, 1966  3 Sheets-Sheet 3

INVENTOR.
RICHARD W. DYMOND
BY
Hoffmann and Yount
ATTORNEYS

3,385,220
FLUID PUMP
Richard W. Dymond, East Detroit, Mich., assignor to
Eaton Yale & Towne Inc., Cleveland, Ohio, a corporation of Ohio
Filed Aug. 17, 1966, Ser. No. 572,940
19 Claims. (Cl. 103—41)

ABSTRACT OF THE DISCLOSURE

The present invention relates, in general, to a fluid pump and, more particularly, to a fluid pump having a flow control means associated with the inlet and discharge thereof for controlling flow of fluid from the pump to a fluid system. The flow control means includes a valve member which is disposed in a bore and is operable between a closed position wherein fluid from the pump is directed to the system and an open position wherein fluid is by-passed from the system to a discharge passage. The valve member is moved from the closed position to the open position upon operation of an actuating valve by predetermined fluid pressure in one end of the bore which is connected in fluid communication with the fluid system.

---

A fluid pump embodying the present invention is particularly useful in a hydraulically actuated power steering system for an automotive vehicle. Known pumps utilized in power steering systems are generally driven at speeds which are proportional to the speed of the engine of the vehicle and therefore such pumps operate over wide speed ranges. The operation of hydraulically actuated power steering mechanisms, or apparatus, is generally frequent at low engine speeds when such vehicles are normally being maneuvered and relatively infrequent at high engine speeds. Thus, fluid pumps associated with power steering apparatus should be capable of delivering fluid volumes and pressures sufficient to operate the power steering at low engine speeds. The necessity for providing such volumes and pressures at low engine speeds often results in the provision of fluid at excecessive quantity and pressure values at high engine speeds or at low engine speeds when the power steering apparatus is not operating. Since the system fluid pressure is dissipated in the form of heat, large flows of fluid in the system when the power steering apparatus is not in use result in excessive, undesirable heat build-ups in the system.

Accordingly, a principal object of the present invention is the provision of a new and improved fluid pump having a flow control means which is effective to maintain a fluid flow to a fluid system over a wide pump speed range and which is effective to minimize fluid flow to the system under conditions where there is no requirement therefor to minimize system temperatures.

Another object of the present invention is the provision of a new and improved pump having a flow controlling means associated therewith for controlling flow of fluid from the pump to a fluid system and wherein the flow control means includes a valve member operable between a condition wherein fluid from the pump is directed to the system and a condition wherein a portion of the fluid is by-passed from the system, and wherein the valve member is operable between its conditions by actuating means responsive to system pressures.

Another object of the present invention is the provision of a new and improved pump having a flow regulating means associated therewith for controlling flow of fluid to a fluid system and wherein the flow from the pump to the system is controlled in part by a valve member movably disposed in a bore and a variable flow orifice located in the bore and with the orifice varying in response to movement of the valve member to supply a substantially constant amount of motive fluid to the system at low pump speeds and a substantially constant lesser amount of motive fluid at high pump speeds and system pressures above a predetermined pressure.

A further object of the present invention is the provision of a new and improved fluid pump operable to maintain a generally constant output flow of pumped fluid to a fluid system at both high and low system pressures with the flow at the higher system pressure being greater.

A still further object of the present invention is the provision of a new and improved fluid pump, having flow control means operable to supply fluid from the pump to a fluid system in response to pressure changes in the system and including a valve member movable between a position wherein pumped fluid is by-passed from the system and a position wherein pumped fluid is directed to the system with the position of the valve member controlled by a valve means operable at low system pressures to provide a substantial pressure drop across the valve member so as to effect movement of the valve member to its by-pass position and operable at high system pressures to effect movement of the valve member to its position wherein fluid is directed to the system.

Other objects and advantages of the present invention will become apparent to those skilled in the art to which it relates from the following detailed description thereof made with reference to the accompanying drawings which form a part of the specification and wherein.

Figure 2:
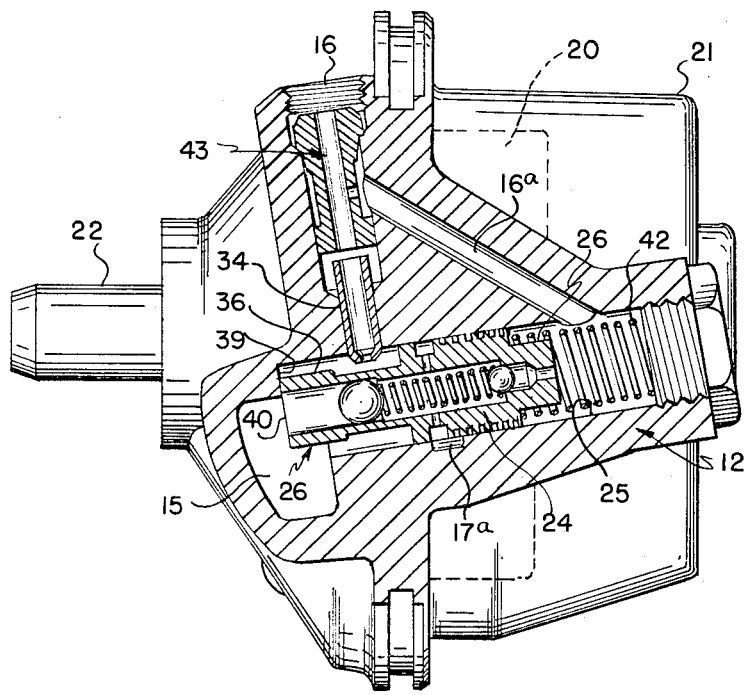
FIG. 2 is a sectional view of a portion of the system shown in FIG. 1.
Figure 3:
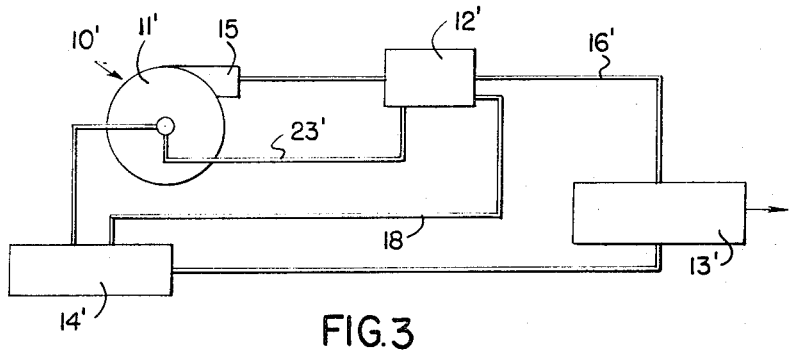
FIG. 3 is a diagrammatical illustration of a fluid system including a second preferred embodiment of the present invention.
Figure 4:
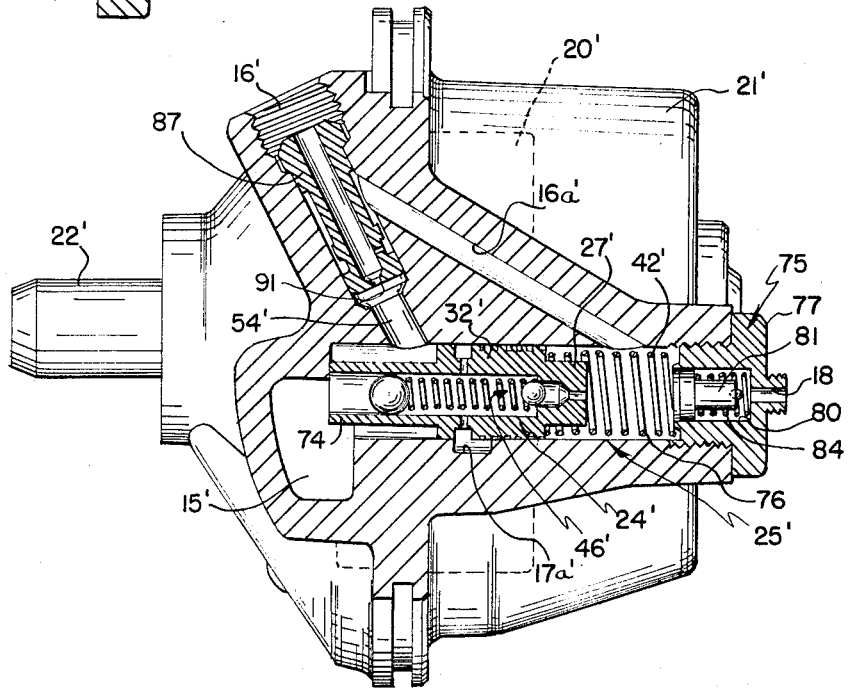
Figure 5:
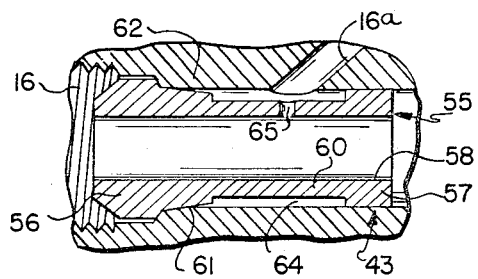
Figure 6:
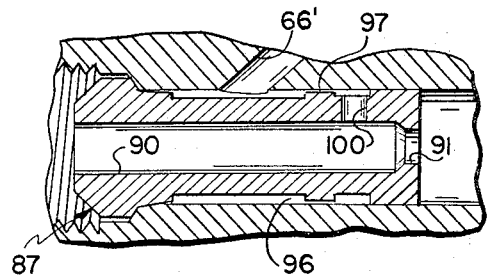
Figure 7:
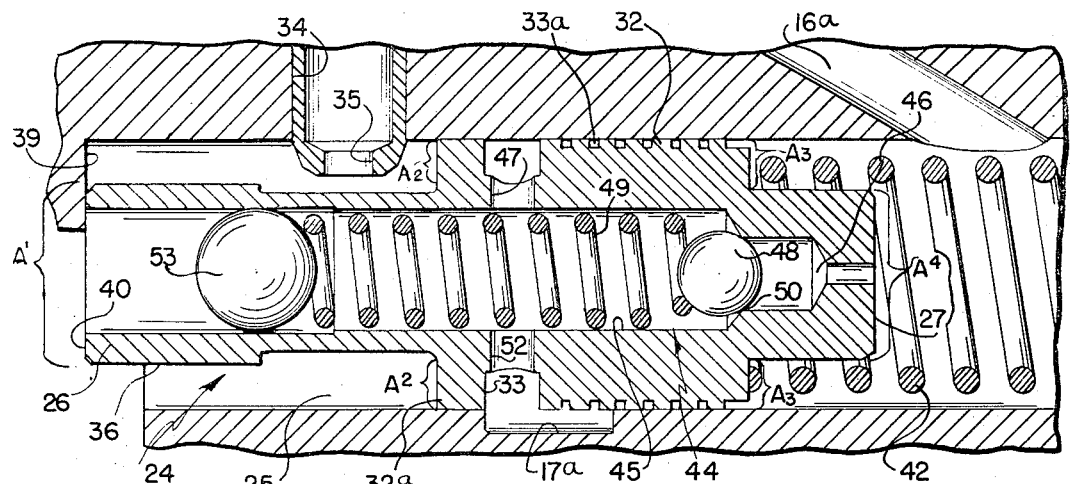
Figure 8:
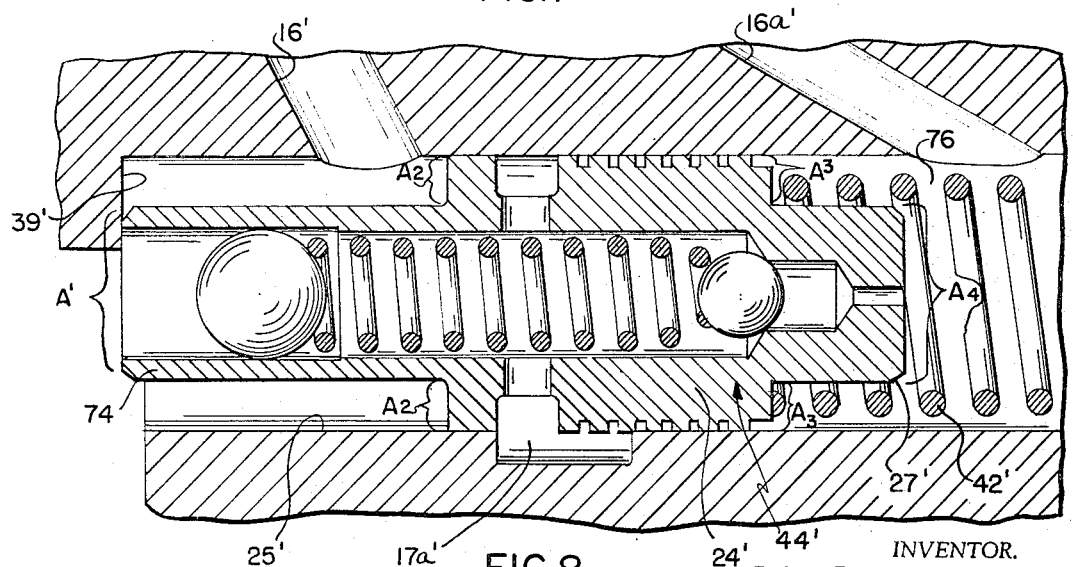

FIG 4. is a sectional view of a portion of the system shown in FIG. 3;

FIG. 5 is a fragmentary elevational view of the portion of the system shown in FIG. 2;

FIG. 6 is a fragmentary elevational view of the portion of the system shown in FIG. 4;

FIG. 7 is a fragmentary elevational view of the portion of the system shown in FIG. 2;

FIG. 8 is a fragmentary view of the portion of the system shown in FIG. 4; and

Figure 9:
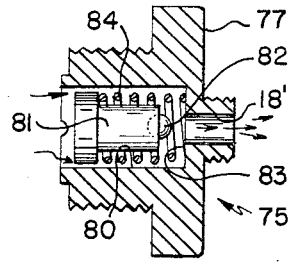

FIG. 9 is a fragmentary view of the portion of the system shown in FIG. 4.

Fluid pumps embodying the present invention are particularly useful for supplying fluid to hydraulically actuated power steering systems for automotive vehicles and have been described and shown in reference to such systems. However, it is not intended that the present invention be limited to use in conjunction with a power steering system. A pump embodying the present invention is adapted for use in any fluid system wherein the pump is likely to be driven at varying rates such that fluid flow from the pump may exceed that which is required by the system.

Figure 1:
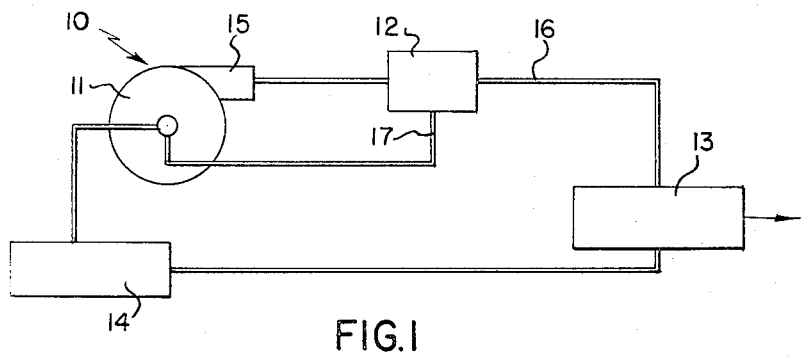
FIG. 1 is a diagrammatical illustration of a fluid system including a preferred embodiment of the present invention.

Referring to the drawings, FIG. 1 illustrates a hydraulic system 10 which includes a pump 11 having a flow control means 12 located between the pump discharge and a hydraulic mechanism 13 which, for example, may be a hydraulically actuated power steering mechanism. The pump 11 delivers fluid to the hydraulic mechanism 13 which is actuated by the pumped fluid and such fluid is exhausted by the hydraulic mechanism to a reservoir 14 from which the fluid may return to the inlet of the pump.

The flow control means 12 is effective to reduce the flow of pumped fluid to the system at high speeds which reduces the pressure in the system accordingly. It should be appreciated that where the hydraulic mechanism 13 is not operating and pump speeds are high, the reduced flow and pressure of the pumped fluid dissipates a minimum amount of heat as it traverses the system from the pump discharge to the reservoir 14 which is essentially at atmospheric pressure. The reduction in heat dissipation, of course, results in substantially reduced system temperatures. The flow control means 12 receives motive fluid from the pump and directs the fluid to the hydraulic mechanism 13 through a flow conduit 16, at flow rates and pressures required to operate the mechanism. The flow control means also operates to by-pass fluid volumes and pressures in excess of the required values from the pump discharge chamber 15 directly to the pump inlet through a conduit means 17, indicated schematically. The pump 11 includes a pump rotor 20, shown schematically, contained in a housing 21. The pump rotor 20 is driven by an input shaft 22 and is associated with a fluid inlet chamber not shown and a discharge chamber 15, respectively, which are formed in the housing.

The flow control means 12 includes a valve body 24 slidably contained in a valve bore 25. The valve body 24 is shiftable in the bore 25 between positions wherein a quantity of the pump discharge fluid is by-passed to the pump inlet, and positions wherein there is no by-passing of the pump discharge fluid. The means for effectuating this movement of the valve body 24 will be described presently in detail. The bore 25 is generally cylindrical and communicates at one end thereof with the pump discharge chamber 15. The valve body 24 is exposed to the pump discharge pressure as fluid enters the bore 25 from the pump discharge chamber 15 at one end 26 thereof and is exposed to fluid pressure from the flow passage 16 leading to the hydraulic mechanism 13 at its other end 27. The flow passage 16 communicates with the bore 25 at the end 27 of the valve member through a passage 16a. Fluid at either end of the valve body 24 is prevented from passing between the valve body and the bore 25 by a valve guide portion 32 on the valve body which is in sliding engagement with the bore 25. The valve guide portion 32 is provided with an annular channel 33 which communicates, in the position shown, with the pump inlet chamber by way of a passage 17a. The valve guide portion 32 additionally includes a plurality of grooves 33a which reduce sliding friction between the bore and the valve body by balancing pressure around the valve body and causing it to "float" centrally in the bore. The grooves 33a additionally provide a tortuous path seal between the valve body 24 and bore 25. The purpose and function of the channel 33 will be more fully described hereinafter.

The flow control means 12 includes flow restricting means between the bore 25 and the hydraulic mechanism 13 for restricting fluid flow from the pump discharge to the system. The flow restricting means includes an orifice body 34 having an orifice 35 formed in an end thereof. At least a portion of the fluid entering the bore 25 from the discharge chamber 15 passes from the bore 25 through the orifice body 34 and orifice 35 before entering the flow passage 16. The orifce 35 is a primary flow restricting orifice which causes a drop in the pressure of the fluid passing therethrough to the hydraulic mechanism 13. The end of the orifice body 34 having the orifice therein projects into the bore 25 intermediate the ends thereof and is spaced from the discharge chamber 15. The orifice 35 restricts the flow so that th pressure of the fluid in the flow passage 16 will always be less than the pressure in the bore 25, upstream of the orifice 35, when fluid flows through the orifice. As previously mentioned, the flow passage 16 is in pressure communication with the end 27 of the valve body through the passage 16a. It should be apparent that when fluid is flowing in the system, a pressure differential thus exists across the valve body 24 as a result of the flow restricting operation of the orifice 35.

As illustrated in FIG. 2, the end 26 of the valve body 24 includes a projecting end portion 36 having an end surface 40, a portion of which engages a projection 39 defining an end surface of the bore 25. Engagement of the surface 40 of the valve body 24 with the projection 39 limits movement of the valve body toward the left, as viewed in the drawings. A spring 42, acting between the end 27 of the valve body and the housing, biases the valve body into engagement with the projection 39. In the position of the valve body 24 illustrated in FIG. 2 the pump 11 is stopped or is pumping at low fluid flow or pressure values so that the spring force exceeds any fluid pressure forces acting on the valve body.

Fluid entering the bore 25 from the pump discharge chamber 15 acts directly on effective areas A1 and A2 at the end 26 of the valve body, while pressure from the flow passage 16a acts on effective areas A3 and A4 at the opposite end 27 of the valve body 24. The effective areas at each side of the valve body 24 are equal so that when fluid initially flows in the system the valve body 24 will be subjected to a differential pressure force due to the action of the orifice 35. This differential force tends to urge the valve body 24 toward the right, as viewed in the drawings, and against the bias of the spring 42. This differential pressure force however is not sufficient to overcome the bias of the spring 42 at system pressures below a predetermined pressure.

The flow control means 12 includes means for effecting by-passing of fluid from the pump discharge chamber to the pump inlet chamber in response to a predetermined fluid pressure in the system. As illustrated in the drawings the means for effecting by-passing of the pump discharge fluid includes a secondary flow restricting means 43 located in the flow passage 16 and relief valve means 44 communicating with the secondary orifice and with the pump inlet through the passage 17a.

The relief valve means 44 is preferably a check or relief valve carried by the valve body 24. The valve body 24 is formed with a cylindrical cavity 45 therein which extends substantially the entire length of the valve body. The cavity 45 communicates with the exterior of the valve body 24 by means of a passageway 46 extending between the cavity 45 and the end 27 of the valve body 24, and ports 47 which extend between the cavity 45 and the annular channel 33. The valve means 44 incluídes a check ball 48 and a spring 49 which urges the check ball 48 against a seat 50 formed by the juncture of the cavity 45 and the passageway 46. The cavity 45 is sealingly closed by suitable means such as a spherical member 53 which is fixed in the cavity 45 near its left-hand end, as viewed in the drawings. The spherical member 53 seals the cavity 45 against ingress and egress of fluid and provides a seat for the spring 49.

The secondary flow restricting means 43 includes an orifice tube 55. The orifice tube 55 is a generally cylindrical body having a cylindrical flow passage 58 therethrough for directing fluid from the orifice member 35 to the hydraulic mechanism 13. The orifice tube 55 includes enlarged opposite end portions 56, 57 and a body portion 60 of reduced diameter, extending therebetween. As shown in FIG. 5, the end portion 56 is formed adjacent a conical surface 61 by which the tube 55 is frictionally held in the pump housing. The opposite end portion 57 of the tube is in sealing engagement with the passage 16 such that fluid is prevented from passing between the enlarged end portion 57 and the passage wall.

The body 60 of the orifice tube 55 is spaced from the wall of passage 16 to form a chamber 64 therebetween. The chamber 64 is in fluid communication with the passage 58 by way of a port 65 which extends through the body portion 60. The pressure of the fluid in the chamber 64 is communicated to the valve bore 25 through the passage 16a such that pressure of the fluid flowing through the passage 58 acts on effective areas A3 and A4 of the valve body, as previously described, as well as on the check ball 48. It should be appreciated that the structure provided will communicate the static pressure of the fluid flowing through the flow passage 58 to the valve bore 25 adjacent the end 27 of the valve body but the effects of the velocity of the fluid and turbulence in the flow passage 58 will not be communicated to the valve bore 25. By this means, rapid fluctuations in pressure acting on the effective areas A3 and A4 are minimized and lateral vibrations of the valve body are reduced.

As the speed of the pump increases, fluid flow rates will correspondingly increase and pressure in the fluid system 10 increases according to the effective system restriction; that is the effective flow restriction imposed on the pump discharge fluid by the system 10. Shifting movement of the valve body 24 in the bore 25, from its position illustrated in the drawings to a position wherein the pump discharge fluid is by-passed to the pump inlet, is effected when the fluid pressure in the system 10, as controlled by the effective flow restriction of the system, reaches a predetermined value. More specifically, the valve body 24 moves to a by-pass position in response to pilot operation of the relief valve means 44 which opens in response to the predetermined pressure.

When the pressure in the system 10 reaches the aforesaid predetermined value, the check ball 48 is moved from its seat 50 by the pressure communicated thereto from the flow passage 58. When the check ball 48 is moved from its seat, fluid flows from the bore 25 and through the passage 46 into the cavity 45. Fluid in the cavity 45 is directed therefrom through the ports 52 and to the annular channel 33 formed on the periphery of the valve body 24. When the valve body 24 is in its illustrated position, the annular channel 33 is aligned with the port leading to the passage 17a of the pump inlet so that fluid in the cavity 45 flows therefrom to the pump inlet. The small flow escaping the relief valve means 44 causes a small flow rate through the secondary orifice 65 thereby creating a pressure differential across the valve ends 26 and 27 which is sufficient to cause movement of the valve body 24 against the bias of the spring 42. The valve body 24 is moved to the right as viewed in the drawings in response to this pressure differential to by-pass enough fluid to maintain the system at a predetermined pressure controlled by the relief valve.

As the valve body moves to the right, the left end portion 32a of valve guide 32 slides past a port which communicates with the fluid passage 17a leading to the pump inlet chamber. When the valve guide 32 slides past the port a portion of the fluid in the chamber adjacent the end 26 of the valve body is by-passed from the hydraulic mechanism 13 and flows from the pump discharge chamber 15 to the pump inlet chamber through the passage 17a. Establishment of fluid communication between the pump inlet and discharge chambers causes a drop in fluid flow available to the orifice 35 and movement toward the right continues until forces acting on the opposite ends of the valve member 24 equalize. As long as the valve body 24 is away from the stop 39 the pressure on each end of the valve is different. The force of the lower pressure acting on the end 27 of the valve body 24 plus the spring load being equal to the force of the pressure in the bore 25 acting on the effective areas A1 and A2. The valve stabilizes when these pressure forces are balanced.

As pump speed and system pressure continue to increase, the valve body 24 moves further to the right in response to the differential pressure acting thereon, as described hereinabove. After a predetermined amount of movement of the valve body toward the right, the end portion 36 of the valve body 24 moves closely adjacent the flow restricting orifice 35. The end 36 of the valve body throttles the flow of discharge fluid passing through the orifice 35 to decrease the flow rate of fluid through the orifice and to cause an increased pressure drop thereacross. This increased pressure drop causes a corresponding increase in the differential pressure across the valve body 24 resulting in maintenance of the valve body 24 in a fluid by-pass position wherein fluid is by-passed from the pump discharge chamber 15 to the passage 17a. Further movement of the valve member 24 toward the right in response to pump speed changes will increase the amount of fluid by-passed as a result of increased differential pressures across the valve so that the flow of fluid to the system 10 will remain constant over a wide speed range of the pump.

From the above it should be apparent that the flow control means 12 is operable to maintain a substantially constant flow of fluid to the hydraulic mechanism 13 at low pump speeds and system pressures above a predetermined pressure by directing fluid from the discharge chamber of the pump to the inlet chamber of the pump as a result of pilot operation of the relief valve means 44. Moreover, it should be apparent that at high pump speeds when the portion 36 of the valve body 24 has restricted the orifice 35, the flow control means 12 operates to again maintain a substantially constant flow of fluid to the hydraulic mechanism 13, but which amount is less than the amount of fluid delivered to the mechanism 13 at lower pump speeds. Additionally it should be apparent that as a result of the changes in flow to the system due to operation of the flow control means 12, the heat build-up in the system from fluid flowing therethrough is minimized so that system temperatures are maintained at minimum levels.

FIGS. 3, 4, 6 and 9 illustrate a modified pump embodying the present invention and parts which are similar to parts previously described above are designated by corresponding primed reference characters.

FIG. 3 illustrates a hydraulic system 10′ including a pump 11′ which supplies fluid to a hydraulic mechanism 13′ through a flow control means 12′. The hydraulic mechanism 13′ is energized by the fluid delivered thereto by the pump 11. Fluid passing through the hydraulic mechanism 13′ is returned to a reservoir 14′ from which it may flow to the inlet of the pump when required.

Pumped fluid enters the flow control means 12′ through a pump discharge chamber 15′. The flow control means 12′ is operable to by-pass a portion of the pump discharge fluid to a passage 17a′ communicating with the pump inlet chamber. Fluid which is not by-passed, as described, is directed through a flow passage 16′ to the hydraulic mechanism 13′.

The flow control means 12′ is positioned in a pump housing 21′ containing a pump rotor 20′ of conventional construction which is driven by an input shaft 22′. The fluid control means includes a valve body 24′ slidably disposed in a bore 25′. The bore 25′ is open at one end to the pump discharge chamber 15′, and communicates with the passage 16′ which is spaced along the bore 25′ from the discharge chamber 15′ of the pump.

The valve body 24′ is a generally cylindrical member having end portions 74 and 27′ which are spaced apart by a valve guide portion 32′. The valve guide portion 32′ and the end portions 74 and 27′ form effective pressure areas A1, A2 and A3, A4 at opposite ends of the valve body respectively, which areas are of equal size. The valve guide portion 32′ is effective to prevent fluid flow between the valve body and the bore 25′ as described above. As shown in the drawings, the valve body 24′ is in its far leftward position with the end portion 74 thereof abutting a projection or stop 39′ in the bore 25′ which limits movement of the valve body 24′ to the left. In the absence of fluid pressure in the bore 25′, the valve body 24′ is held in abutting engagement with the projection 39′ by the action of a spring 42' which engages the end 27' of the valve body.

At least a portion of the fluid entering the bore 25' from the pump discharge chamber 15' passes from the bore 25' through the flow passage 16' leading to the hydraulic mechanism 13'. The passage 16' contains a flow restricting primary orifice 91 which restricts the flow of fluid to the hydraulic mechanism and causes a pressure drop in the fluid which passes through the orifice 91. An end chamber 76 of the bore 25' is in fluid communication with fluid downstream of the flow restricting orifice 91 by means of a flow passage 16a' such that valve body 24' is acted on at its end 26' by the pressure of the fluid in the pump discharge chamber 15' while at its other end 27' by fluid at a pressure less than that of the pressure in the pump discharge chamber 15'.

Fluid entering the bore 25' from the pump discharge chamber acts directly on effective areas A1, A2 of the valve body 24' urging the valve body to the right against the bias of the spring 42' and the pressure of the fluid in the end chamber 76. At least a portion of the pump discharge fluid flows from the bore 25' and through the flow restricting orifice 91. The orifice 91 is formed integrally in the body of an orifice tube 87 which is frictionally engaged in the passage 16' and which contains a central flow passage 90 for directing fluid to the hydraulic mechanism. A portion of the fluid passing through the orifice 91 flows to the hydraulic mechanism through the central flow passage 90 and a portion flows through a port 100 formed in the orifice tube 87.

The port 100 communicates with a secondary flow restriction or orifice 97 formed between the orifice tube and the bore in which the orifice tube is mounted. Fluid flowing through restriction 97 enters a chamber 96 which is also formed between the wall of the passage 16' and the periphery of the orifice tube 87. It should be apparent that when fluid flows through the restriction 97 the fluid in the chamber 96 is at a lower pressure than the fluid flowing through port 100 since the flow restriction 97 causes a further pressure drop in the fluid flowing therethrough. The chamber 96 communicates with the end chamber 76 through the flow passage 16a'. The chamber 96 serves to isolate the end chamber 76 from rapid pressure changes in the same manner as described above in reference to the chamber 64 of FIG. 5.

Fluid entering the end chamber 76 through the passage 16a' acts on effective areas A3 and A4 of the valve body 24' to resist movement of the valve body toward the right. The fluid so entering the end chamber 76 flows therefrom in a restricted manner to the fluid reservoir 14' through a conduit 18 at system pressures below a predetermined pressure. For this purpose, the end chamber 76 includes valve means 75 for venting fluid from the end chamber 76 to the reservoir.

The valve means 75 includes a threaded valve cap 77 which is threaded into the bore 25' and is in sealing relationship therewith. The valve cap 77 has an opening 80 therethrough and through which fluid may be vented from the end chamber 76 to the fluid reservoir. The opening 80 contains a valve body 81 loosely slidable therein. The valve body 81 carries a ball 82 which is adapted to engage a valve seat 83 formed in a wall of the opening 80 when the valve body 81 is in its extreme right-hand position as viewed in the drawings. The valve body 81 is normally biased away from the valve seat 83 by a spring 84 so that the fluid may flow around the valve body and through a passage 18 leading from the opening to reservoir 14'. The valve body 81 is prevented from moving out of the opening 80 and into the bore 25' by suitable means, not shown.

The clearance between the bore 80 and the valve body 81 acts as a controlled orifice. If pressure in the end chamber 76 increases in response to increased system pressure then the flow through the clearance increases but will not cause an increase in pressure differential across the valve 81 since the conduit 18 is basically at atmospheric pressure.

At low system pressures at any pump speed, the pressure exerted on areas A3 and A4, which is controlled by the restriction 97, is relatively low since the fluid acting thereon has traversed flow restrictions 91, 97, and further since the fluid in the chamber adjacent areas A3 and A4 flows from the chamber into the reservoir 14' through the valve 75. As a result of this relatively low pressure acting on the areas A3 and A4 a relatively large pressure differential exists across the valve body 24' such that the valve body 24' moves to the right and causes fluid to be by-passed into the passage 17a' thereby maintaining a low controlled flow to the mechanism 13'. Since the amount of flow through the passage 80 remains constant and fluid is by-passed through the passage 17a' depending on the discharge pressure, the flow to the system remains substantially constant until the valve 75 closes.

When the system pressure reaches a predetermined pressure value, the fluid pressure in the end chamber 76 of the bore 25' will be such that the valve body 81 is urged onto the seat 83 in the valve cap 77 to cut off the flow from the end chamber 76 to the reservoir. When flow through the valve 75 is stopped, the pressure drop across the restriction 97 becomes non-existent since there is no flow therethrough and the pressure acting on effective areas A3 and A4 of the valve body becomes the static pressure of the fluid passing through the flow passage 16' on the downstream side of the orifice 91. This increase in pressure acting on the effective pressure areas A3 and A4 of the valve body 24' causes the valve body 24' to move toward the left so that less fluid is by-passed to the passage 17a' and the mechanism 13' will be provided with fluid from the pump in larger quantities and at a high pressure. If system pressure increases above this predetermined pressure, the valve body 24' will move to by-pass less fluid from the system until the fluid pressure acting on areas A1 and A2 of the valve body 24' is balanced by the static pressure of fluid in the chamber 76 acting on the effective areas A3 and A4 and the action of spring 42'. Similarly, changes in pump speed at system pressures above the predetermined pressure cause the valve body 24' to move in the bore 25' and control the amount of fluid directed to the system. It should be apparent that when the system reaches a pressure which exceeds the predetermined pressure and the valve 75 closes, a higher constant flow of fluid is delivered to the hydraulic system than would be maintained at some lower pressure. Since high flow rates are usually only required by the system when high pressures are also required, for example, steering conditions for parking or for fast turns at slow vehicle speeds, the flow control means 12' is effective to keep flow rates through the system 13' low at all pump speeds except when steering requires pressures above some minimum, such as 200–300 p.s.i. for example. Thus the flow control means 12' is highly effective in reducing system temperatures by reducing the flow of fluid thereto when fluid requirements of the system are low.

If the fluid pressure in the system should become excessive a check valve assembly 44', carried within the valve body 24', operates to by-pass fluid through the valve body and into the pump inlet, to limit the system pressure. The construction of the check valve 44' and associated fluid passageways is the same as described in reference to FIGS. 2 and 7.

From the above, it should be apparent that the valve mechanism including the valve 75, when open, along with the orifice 91 and the orifice 97 provide a substantial pressure drop across the valve member 24' so to effect movement of the valve member to by-pass fluid and maintain a constant low fluid flow at low system pressures. It should be further apparent that the valve 75 closes in response to a predetermined system pressure to effect movement of the valve body 24' to provide an increased flow of fluid to the system. Thus the valve 75 may be termed a "stage control" valve which is operable to maintain a relatively constant low fluid flow from the pump at low system pressures and which is effective to provide for a relatively constant higher fluid flow at system pressures above a predetermined pressure.

It should further be apparent from the above detailed description that certain modifications, changes and adaptations may be made in the present invention by those skilled in the art to which it relates, and it is thereby intended to cover all such modifications, changes and adaptations falling within the scope of the appended claims.

Having described my invention, I claim:

1. In a pump for supplying fluid to a system and including inlet and discharge passages, a bore having openings therein communicating with said inlet and discharge passages, a valve member slidably disposed in said bore and operable between a first condition wherein fluid from said pump discharge is directed to said system and a second condition wherein a portion of said discharge fluid is by-passed from said system to said inlet passage, resilient means engaging said valve member for urging said valve member to said first condition, said valve member being operable from said first condition to said second condition against the urging of said resilient means by a pressure differential across opposing surfaces of said valve member, and actuating means operable in response to fluid pressure in said system to control the condition of said valve member, said actuating means including valve means for enabling fluid to flow therethrough to said inlet passage when the pressure in said system exceeds said predetermined pressure, said flow of fluid from said system through said valve mean to said input passage providing a sufficient pressure differential across opposing surfaces of said valve member to operate said valve member to said second condition against the urging of said resilient means to thereby by-pass fluid from said system to said inlet passage.

2. In a pump for supplying fluid to a system including inlet and discharge passages, a bore having openings therein communicating with said inlet and discharge passages, a valve member slidably disposed in said bore and operable between a first condition wherein fluid from said pump discharge is directed to said system and a second condition wherein a portion of said discharge fluid is by-passed from said system to said inlet passage, actuating means operable in response to the fluid pressure in said system to control the condition of said valve member, said actuating means including valve means operable between an open position wherein fluid flows therethrough and said valve member is maintained in said second condition and a closed position wherein said valve member is maintained in said first condition, first flow restricting means between said bore and said system for restricting the flow of said pump discharge fluid from said bore to said system and decreasing the pressure thereof, and second flow restricting means between said system and said valve means for restricting fluid flow from said system to said valve means, and wherein said valve member includes spaced surfaces thereon, one of said surfaces being exposed to said pump fluid discharge pressure and the other of said surfaces being exposed to fluid pressure transmitted from said second flow restriction means with operation of said valve means between said open and closed positions creating a pressure differential between said surfaces and effecting movement of said valve member between said conditions.

3. In a pump for supplying fluid to a system and including inlet and discharge passages, a bore having openings therein communicating with said inlet and discharge passages, a valve member slidably disposed in said bore and operable between a first condition wherein fluid from said pump discharge is directed to said system and a second condition wherein a portion of said discharge fluid is by- passed from said system to said inlet passage, actuating means operable in response to fluid pressure in said system to control the condition of said valve member, said actuating means including valve means operable between an open position wherein fluid flows therethrough and said valve member is maintained in said second condition and a closed position wherein said valve member is maintained in said first condition, first flow restricting means between said bore and said system for restricting flow of said pump discharge fluid from said bore to said system and decreasing the pressure thereof, and second flow restricting means between said system and said valve means for restricting fluid flow from said system to said valve means, and wherein said valve member includes spaced surfaces thereon exposed to said pump fluid discharge pressure and fluid pressure at said valve means respectively, with operation of said valve means between said open and closed positions creating a pressure differential between said surfaces and effecting movement of said valve member between said conditions, said valve means including a member movable at a predetermined system pressure to open said valve means, said valve means opening and creating a flow of fluid through said second flow restricting means, said open valve means and said second flow restricting means cooperating to provide said pressure differential between said spaced surfaces of said valve member.

4. In a pump as defined in claim 3 wherein said first flow restricting means includes a member having an orifice therein, and further including means for restricting flow through said orifice in response to movement of said valve member to said second condition, said means effective to minimize the flow of fluid to said system when said valve member is in said second condition.

5. In a pump of the type defined in claim 4 wherein said means for restricting flow through said orifice includes a part on said valve body movable to a position closely adjacent said orifice when said valve member is in its said second condition and effective to restrict the flow through said orifice upon movement of said valve member while in said second condition.

6. In a pump as defined in claim 2 wherein said valve means in said open position maintains said valve member in its said second condition with said valve member effective to direct fluid to said system in quantities which vary with system pressure, and said valve means includes a valve part movable at a predetermined pressure in the system to close said valve means to fluid flow therethrough, movement of said valve part to its closed position creating a pressure differential across said surfaces to move said valve member from its second condition to its first condition.

7. In a pump as defined in claim 6 wherein said valve means in its open position is effective to permit varying flow rates of fluid therethrough at system pressures below said predetermined pressure to maintain said valve member in its said second condition.

8. In a pump for supplying fluid to a system and including inlet and discharge passages, a bore having openings therein communicating with said inlet and discharge passages, a valve member slidably disposed in said bore and operable between a first condition wherein fluid from said pump discharge is directed to said system and a second condition wherein a portion of said discharge fluid is by-passed from said system to said inlet passage, actuating means operable in response to fluid pressure in said system to control the condition of said valve member, said actuating means including valve means operable between an open position wherein fluid flows therethrough and said valve member is maintained in said second condition and a closed position wherein said valve member is maintained in said first condition, first flow restricting means between said bore and said system for restricting flow of said pump discharge fluid from said bore to said system and decreasing the pressure thereof, and second flow restricting means between said system and said valve means for restricting fluid flow from said system to said valve means, and wherein said valve member includes spaced surfaces thereon exposed to said pump fluid discharge pressure and fluid pressure at said valve means respectively, with operation of said valve means between said open and closed positions creating a pressure differential between said surfaces and effecting movement of said valve member between said conditions, said valve means in said open condition being effective to permit varying flow rates of fluid therethrough at system pressures below said predetermined pressure to maintain said valve member in its second condition with said valve member effective to direct fluid to said system in quantities which vary with system pressure, and said valve means includes a valve part movable at a predetermined pressure in the system to close said valve means to fluid flow therethrough, movement of said valve part to its closed position creating a pressure differential across said surfaces to move said valve member from its second condition to its first condition, said valve means further including a member having an opening therein communicating with said second flow restricting means and a reservoir of said system and receiving said valve part, said valve part including a first portion spaced from a wall of said opening and providing a restricted flow passage therebetween and a second portion movable with said valve part into engagement with said wall of said opening to prevent fluid flow therethrough, and spring means urging said valve part to its open position.

9. In a pump for supplying fluid to a fluid system and having fluid inlet and discharge passages, flow control means for maintaining a substantially constant flow of fluid to said system at low pump speed and a lesser constant fluid flow to said system at high pump speed, said flow control means including a valve bore for communicating with said discharge and inlet passages and with said system, a valve member movable in said valve bore between a first condition blocking a flow of fluid through said control means to said inlet passage and a second condition enabling fluid to flow from said control means to said inlet passage to by-pass fluid from said discharge passage to said inlet passage, means operable in response to fluid pressure in said system for moving said valve member to said second condition from said first condition, and means for restricting flow to said system after a predetermined amount of movement of said valve body toward said second condition and during continued movement of said valve body after said predetermined amount of movement.

10. In a pump for supplying fluid to a fluid system and having fluid inlet and discharge passages, flow control means for maintaining a substantially constant flow of fluid to said system at low pump speeds and a lesser constant fluid flow to said system at high pump speeds, said flow control means including a valve bore for communicating with said discharge and inlet passages and with said system, a valve member movable in said valve bore in response to a pressure differential across said valve member to by-pass fluid from said discharge passage to said inlet passage, means operable in response to fluid pressure in said system for moving said valve member to a by-pass position from a position wherein fluid flows from said discharge passage to said system, and means for restricting flow to said system after a predetermined amount of movement of said valve member towards said by-pass position and during continued movement of said valve member after said predetermined amount of movement, said means for restricting flow to said system including an orifice means in said bore and a part on said valve member and wherein said part on said valve member moves closely adjacent said orifice means after said predetermined amount of movement of said valve member.

11. In a fluid pump for delivering fluid to a fluid system and having inlet and discharge chambers, flow control means for maintaining a substantially constant flow of fluid to said system as pump speed varies, said flow control means comprising a valve bore having a first end communicating with said system and a second end communicating with said discharge chamber, a first outlet opening communicating said valve bore with said system, a second outlet opening communicating said valve bore with said inlet chamber, a valve body movable in said valve bore in response to differential pressure across said valve body and operable in a first condition to direct fluid from said discharge chamber to said inlet chamber to by-pass fluid from said system and a second condition to direct fluid from said discharge chamber to said system, and valve means communicating with said first end of said bore and providing a fluid passageway to vent fluid from said first end of said bore at low system pressures to maintain said valve member in said first condition, said valve means including a member movable to close said vent passageway when the pressure in said one end of said bore increases above a predetermined pressure to shift said valve member to said second condition.

12. In a fluid pump as defined in claim 11 wherein said valve means vents fluid from said one end of said bore substantially independent of the pressure in said bore up to a predetermined system pressure.

13. In a fluid pump as defined in claim 11 wherein said valve means includes a part forming a flow passageway and with said movable member in said passageway and movable in response to changes in system pressure, said part and said member being spaced apart to form said vent passageway at system pressures below said predetermined pressure, said member moving at said predetermined pressure to engage said part and close said passageway, and biasing means urging said movable member away from engagement with said part.

14. In a fluid pump as defined in claim 11 and further including second valve means carried by said valve member and operable in response to a predetermined pressure in said system to by-pass fluid from said first end of said bore to said inlet chamber.

15. In a pump for supplying fluid to a system and including inlet and discharge passages, a bore having spaced openings therein communicating with said passages, a valve member slidably disposed in said bore and movable between a first position wherein fluid is directed from said discharge passage to said system and a second by-pass position wherein a portion of said discharge fluid is by-passed from said system and to said inlet passage, and flow restricting means between said system and said pump discharge passage, said flow restricting means including a flow restricting orifice spaced from said valve member, said valve member including a surface movable closely adjacent said orifice to further restrict the flow of fluid therethrough when said valve member is in said by-pass position.

16. In a fluid pump for delivering fluid to a hydraulic system and having inlet and discharge chambers, a housing having a bore formed therein with one end portion of said bore connected in fluid communication with said discharge chamber, flow restricting means mounted in fluid communication with said one end portion of said bore and said hydraulic system for decreasing the pressure of fluid flowing from said discharge chamber to said hydraulic system, fluid conduit means connected in fluid communication with another end of said bore and with said hydraulic system for conducting fluid to said other end of said bore after the fluid has passed through said flow restricting means, an outlet means in said bore for connecting said bore in fluid communication with said inlet chamber, a valve member slidably mounted in said bore for movement between a closed position blocking said outlet means and an open position enabling fluid to be by-passed from said system to said inlet chamber through said outlet means, said valve member including one surface exposed to fluid pressure from said discharge chamber to urge said valve member toward said open position, said valve member including another surface exposed to fluid pressure in said other end portion of said bore, first spring means engaging said valve member for urging said valve member towards said closed position, valve means connected in fluid communication with said other end portion of said bore and said inlet means for controlling the movement of said valve member, and second spring means engaging said valve means for urging said valve means toward a closed position blocking a flow of fluid to said inlet means from said other end portion of said bore, said valve means being operable to an open position against the urging of said second spring means by a predetermined pressure in said other end portion of said bore to enable fluid to flow from said other end portion of said bore to said outlet means to thereby reduce the fluid pressure against said other surface of said valve member to enable said valve member to move from said closed position to said open position to by-pass fluid from said hydraulic system to said outlet means.

17. In a pump as set forth in claim 16 wherein said valve member includes a second bore, and said valve means and said second spring means are mounted in said second bore.

18. In a pump as set forth in claim 16 wherein said valve member includes an end portion which is movable from a first position in which said end portion has substantially no effect on the flow of fluid through said flow restricting means to a second position in which said end portion restricts the flow of fluid through said flow restricting means, said end portion being moved from said first position to said second position by movement of said valve member from said closed position to said open position.

19. In a pump as set forth in claim 16 further including a valve assembly located in fluid communication with said other end of said bore, said valve assembly including a valve body movable from an open position enabling fluid to flow from said other end of said bore through a vent passage to a closed position blocking said passage, said valve body being moved from said open position to said closed position by pressure which is lower than said predetermined pressure to thereby block said vent passage and enable said predetermined pressure to be formed in said other end of said bore.

References Cited
UNITED STATES PATENTS

| | | | |
|---|---|---|---|
| 2,612,112 | 9/1952 | Williams | 137—108 X |
| 2,747,598 | 5/1956 | Wooldridge | 137—108 |
| 2,829,664 | 4/1958 | Mountford | 103—41 X |
| 3,101,187 | 8/1963 | Campbell | 137—108 X |
| 3,146,719 | 9/1964 | Drutchas | 103—42 |
| 3,253,607 | 5/1966 | Drutchas | 103—42 X |
| 3,266,426 | 8/1966 | Brunson | 103—42 X |
| 3,267,864 | 8/1966 | Eddy | 103—42 |

DONLEY J. STOCKING, *Primary Examiner.*

W. J. KRAUSS, *Assistant Examiner.*